UNITED STATES PATENT OFFICE.

RUDOLF REYHER, OF OFFENBACH-ON-THE-MAIN, GERMANY, ASSIGNOR TO CORPORATION OF CHEMISCHE FABRIK, GRIESHEIM-ELEKTRON, OF FRANKFORT-ON-THE-MAIN, GERMANY.

YELLOW MONOAZO DYES AND PROCESS OF MAKING THEM.

1,084,363. Specification of Letters Patent. Patented Jan. 13, 1914.

No Drawing. Application filed May 22, 1913. Serial No. 769,171.

*To all whom it may concern:*

Be it known that I, RUDOLF REYHER, doctor of philosophy, chemist, and a subject of the Russian Emperor, and resident of Offenbach-on-the-Main, in the Grand Duchy of Hesse, Germany, with the post-office address Dreieichring No. 18, have invented new and useful Improvements in Yellow Monoazo Dyes and Processes of Making Them, of which the following is a specification.

My invention relates to the production of new yellow monoazo dyes, which are obtained by combining the diazo compound of 1.2.3-meta-xylidin ($CH_3:NH_2:CH_3 - 1:2:3$) body with a 1-sulfoaryl-5-pyrazolone-3-carboxylic acid. Under the term adjacent meta-xylidin body I include 1.2.3-meta-xylidin and its sulfonic acids. The dyestuffs, thus obtained, which have probably the formula

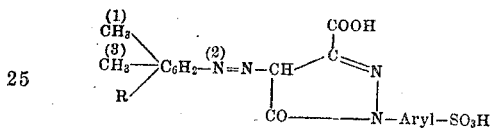

wherein R means H, $SO_3H$, are, when dry, yellow to orange powders, easily soluble in water to an yellow solution, dyeing wool immensely beautiful greenish yellow shades of an excellent fastness to light and yielding upon reduction with stannous chlorid and hydrochloric acid a 1.2.3-meta-xylidin body and a 1-sulfoaryl-4-amino-pyrazolone-3-carboxylic acid. As such a 1-sulfoaryl-5-pyrazolone-3-carboxylic acid, as is used, as aforesaid, for the production of the dyestuffs, can be employed each pyrazolone-carboxylic acid containing the sulfo group and a substituent such as $CH_3$, Cl in ortho, meta or para position to N.

In practising the new process I may proceed as follows the parts being by weight:

Example: 20.1 parts of 1.2.3-meta-xylidin-4-sulfonic acid, obtained by sulfonating the 1.2.3-meta-xylidin with fuming sulfuric acid are diazotized in the usual manner. The solution thus obtained, is poured on stirring at 0-5° C. into a solution of 36.3 parts of the sodium salt of 1-ortho-chloro-meta-sulfophenyl-5-pyrazolone-3-carboxylic acid in about 500 parts of water and 19 parts of calcinated soda. When the combination is complete, the solution is heated at about 80° C. and the dyestuff is then after evaporating isolated by adding hydrochloric acid and common salt. When dry the dyestuff having probably the formula

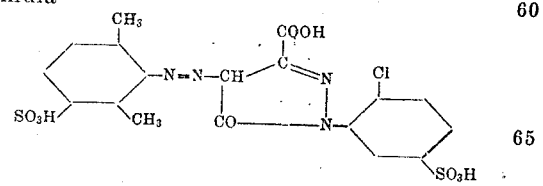

is an orange powder, hardly soluble in alcohol, very easily soluble in water to a greenish yellow solution, in sulfuric acid to an yellow solution, dyeing wool immensely beautiful greenish yellow shades of an excellent fastness to light and yielding upon reduction with stannous chlorid and hydrochloric acid 1.2.3-meta-xylidin-4-sulfonic acid and 1-ortho-chloro-meta-sulfophenyl-4-amino-5-pyrazolone-3-carboxylic acid. In like manner the combination can be made with 1.2.3-meta-xylidin or its 5-sulfonic acid, obtainable by baking 1.2.3-meta-xylidin with 1 molecule of sulfuric acid of 66° Bé. at 200°. Instead of 1-ortho-chloro-meta-sulfophenyl-5-pyrazolone-3-carboxylic acid 1-ortho-chloro-para-sulfophenyl-5-pyrazolone-3-carboxylic acid or 1-ortho-methyl-meta- and para- sulfophenyl-5-pyrazolone-3-carboxylic acid can be employed, or also an other 1-sulfoaryl-5-pyrazolone-3-carboxylic acid.

Now what I claim and desire to secure by Letters Patent is the following:

1. Process of making yellow monoazo dyes, consisting in combining the diazo compound of 1.2.3-meta-xylidin body with a 1-sulfoaryl-5-pyrazolone-3-carboxylic acid.

2. As new articles the monoazo dyes, obtained by combining the diazo compound of 1.2.3-meta-xylidin body with a 1-sulfoaryl-5-pyrazolone-3-carboxylic acid, which are, when dry, yellow to orange powders, easily soluble in water to a yellow solution, dyeing wool immensely beautiful greenish yellow shades of an excellent fastness to light and yielding upon reduction with stannous chlorid and hydrochloric acid 1.2.3-meta-xylidin body and a 1-sulfoaryl-4-amino-5-pyrazolone-3-carboxylic acid.

3. Process of making yellow monoazo dyes, consisting in combining the diazo compound of 1. 2. 3-meta-xylidin sulfonic acid with a 1-sulfoaryl-5-pyrazolone-3-carboxylic acid.

4. As new articles the monoazo dyes, obtained by combining the diazo compound of 1. 2. 3 - meta - xylidin sulfonic acid with a 1-sulfoaryl-5-pyrazolone-3-carboxylic acid, which are, when dry, yellow to orange powders, easily soluble in water to a yellow solution, dyeing wool immensely beautiful greenish yellow shades of an excellent fastness to light and yielding upon reduction with stannous chlorid and hydrochloric acid 1. 2. 3-meta-xylidin sulfonic acid and a 1 - sulfoaryl-4-amino - 5 - pyrazolone - 3 - carboxylic acid.

5. Process of making yellow monoazo dyes, consisting in combining the diazo compound of 1. 2. 3-meta-xylidin sulfonic acid with a 1-sulfo-chloro-phenyl-5-pyrazolone-3-carboxylic acid.

6. As new articles the monoazo dyes, obtained by combining the diazo compound of 1. 2. 3-meta-xylidin sulfonic acid with a 1-sulfo-chloro-phenyl-5-pyrazolone-3-carboxylic acid which are, when dry, yellow to orange powders, easily soluble in water to a yellow solution, dyeing wool immensely beautiful greenish yellow shades of an excellent fastness to light and yielding upon reduction with stannous chlorid and hydrochloric acid 1. 2. 3-meta-xylidin sulfonic acid and a 1-sulfo-chloro-phenyl-4-amino-5-pyrazolone-3-carboxylic acid.

7. Process of making a yellow monoazo dye, consisting in combining the diazo compound of the 1. 2. 3-meta-xylidin-4-sulfonic acid with 1-ortho-chloro-meta-sulfophenyl-5-pyrazolone-3-carboxylic acid.

8. As a new article the monoazo dye obtained by combining the diazo compound of the 1. 2. 3 - meta - xylidin - 4 - sulfonic acid with 1 - ortho - chloro - meta - sulfophenyl - 5-pyrazolone-3-carboxylic acid, which is, when dry, an orange powder, hardly soluble in alcohol, very easily soluble in water to a greenish yellow solution, in sulfuric acid to a yellow solution, dyeing wool immensely beautiful greenish yellow shades of an excellent fastness to light and yielding upon reduction with stannous chlorid and hydrochloric acid 1. 2. 3-meta-xylidin-4-sulfonic acid and 1-ortho-chloro-meta-sulfophenyl-4-amino-5-pyrazolone-3-carboxylic acid.

In testimony, that I claim the foregoing as my invention, I have signed my name in presence of two witnesses, this 10th day of May 1913.

RUDOLF REYHER.

Witnesses:
 PETER LAUTENSCHLÄGER,
 FRITZ DÉSOR.